United States Patent
Jang et al.

(10) Patent No.: US 11,813,552 B2
(45) Date of Patent: Nov. 14, 2023

(54) DISPERSING APPARATUS AND DEFOAMING APPARATUS COMPRISING SAME

(71) Applicant: LG Chem, Ltd., Seoul (KR)

(72) Inventors: Jung Kee Jang, Daejeon (KR); Jeong Hun Cho, Daejeon (KR); Joon Hee Cho, Daejeon (KR); Ye Hoon Im, Daejeon (KR); Young Soo Song, Daejeon (KR)

(73) Assignee: LG Chem, Ltd.

( * ) Notice: Subject to any disclaimer, the term of this patent is extended or adjusted under 35 U.S.C. 154(b) by 654 days.

(21) Appl. No.: 16/964,041

(22) PCT Filed: Aug. 20, 2019

(86) PCT No.: PCT/KR2019/010574
§ 371 (c)(1),
(2) Date: Jul. 22, 2020

(87) PCT Pub. No.: WO2020/040524
PCT Pub. Date: Feb. 27, 2020

(65) Prior Publication Data
US 2021/0039021 A1    Feb. 11, 2021

(30) Foreign Application Priority Data

Aug. 21, 2018  (KR) .................. 10-2018-0097495
Jun. 26, 2019  (KR) .................. 10-2019-0076630

(51) Int. Cl.
*B01D 19/02*    (2006.01)
*D01D 1/10*     (2006.01)
*B01F 23/50*    (2022.01)

(52) U.S. Cl.
CPC .............. *B01D 19/02* (2013.01); *B01F 23/50* (2022.01); *D01D 1/103* (2013.01); *B01F 23/56* (2022.01)

(58) Field of Classification Search
CPC .... B01D 19/02; B01D 3/008; B01D 19/0042; B01D 19/00; B01F 23/50; B01F 23/56; D01D 1/103; D01D 1/10
See application file for complete search history.

(56) References Cited

U.S. PATENT DOCUMENTS 2,773,555 A    12/1956  Pape
4,007,022 A    2/1977   Schleicher et al.
(Continued)

FOREIGN PATENT DOCUMENTS

CN    102427865 A    4/2012
CN    203663472 U    6/2014
(Continued)

OTHER PUBLICATIONS

Chinese Search Report for Application No. 201980008605.6 dated Oct. 11, 2021, 2 pages.
(Continued)

*Primary Examiner* — Christopher P Jones
*Assistant Examiner* — Phillip Y Shao
(74) *Attorney, Agent, or Firm* — Lerner David LLP

(57) ABSTRACT

The present invention relates to a dispersion device and a defoamation device comprising the same, which provides a dispersion device comprising a dispersion plate equipped with an inclined surface extended downwards obliquely and raw material inflow nozzles formed on the inclined surface to introduce a raw material into the inclined surface; and a band spaced apart from the inclined surface of the dispersion plate to form a gap from the inclined surface, thereby being configured so that the raw material flows through the gap.

11 Claims, 3 Drawing Sheets

(56) References Cited

U.S. PATENT DOCUMENTS

| | | | |
|---|---|---|---|
| 4,338,100 A | 7/1982 | Wersosky et al. | |
| 4,764,254 A * | 8/1988 | Rosenblad | F28D 3/04 |
| | | | 162/251 |
| 4,810,327 A | 3/1989 | Norrmen | |
| 6,338,749 B1 * | 1/2002 | Fulk | B01D 19/0021 |
| | | | 96/197 |
| 6,730,146 B2 * | 5/2004 | Shah | B01D 19/0042 |
| | | | 96/198 |
| 2002/0039547 A1 | 4/2002 | Nelson et al. | |
| 2003/0205142 A1 | 11/2003 | Shah | |

FOREIGN PATENT DOCUMENTS

| | | |
|---|---|---|
| DE | 2441304 A1 | 3/1976 |
| EP | 0050938 A1 | 5/1982 |
| EP | 2433691 A1 | 3/2012 |
| FR | 2283154 A1 | 3/1976 |
| GB | 1503554 A | 3/1978 |
| JP | S5150991 A | 5/1976 |
| JP | S543968 A | 1/1979 |
| JP | S6352926 B2 | 10/1988 |
| KR | 20000016285 A | 3/2000 |
| KR | 20100127639 A | 12/2010 |
| KR | 101152305 B1 | 6/2012 |
| KR | 20140023143 A | 2/2014 |
| KR | 20160036344 A | 4/2016 |
| WO | 2010134122 A1 | 11/2010 |

OTHER PUBLICATIONS

International Search Report for Application No. PCT/KR2019/010574 dated Nov. 21, 2019, 2 pages.

* cited by examiner

[Figure 1]
-- Prior Art --
10
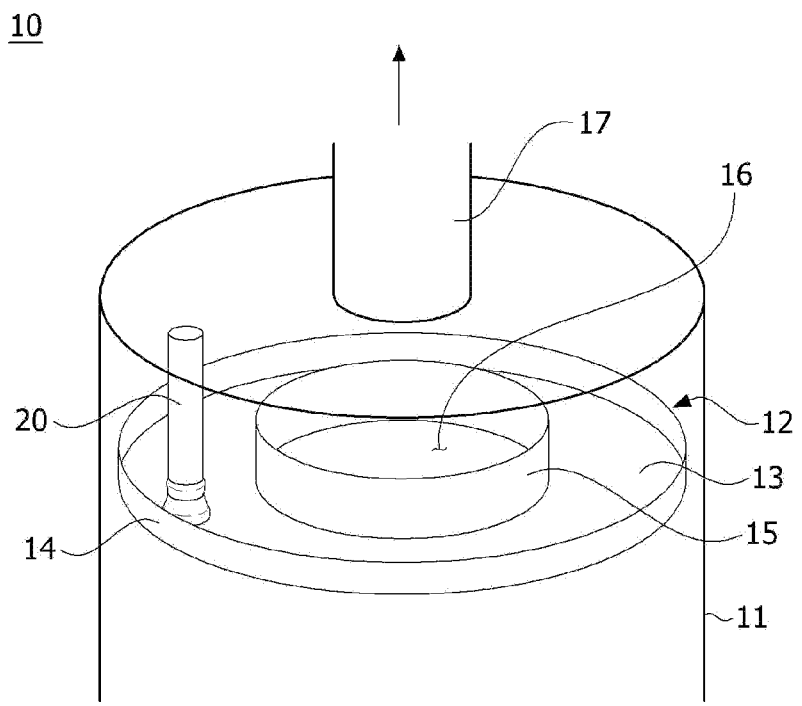

[Figure 2]
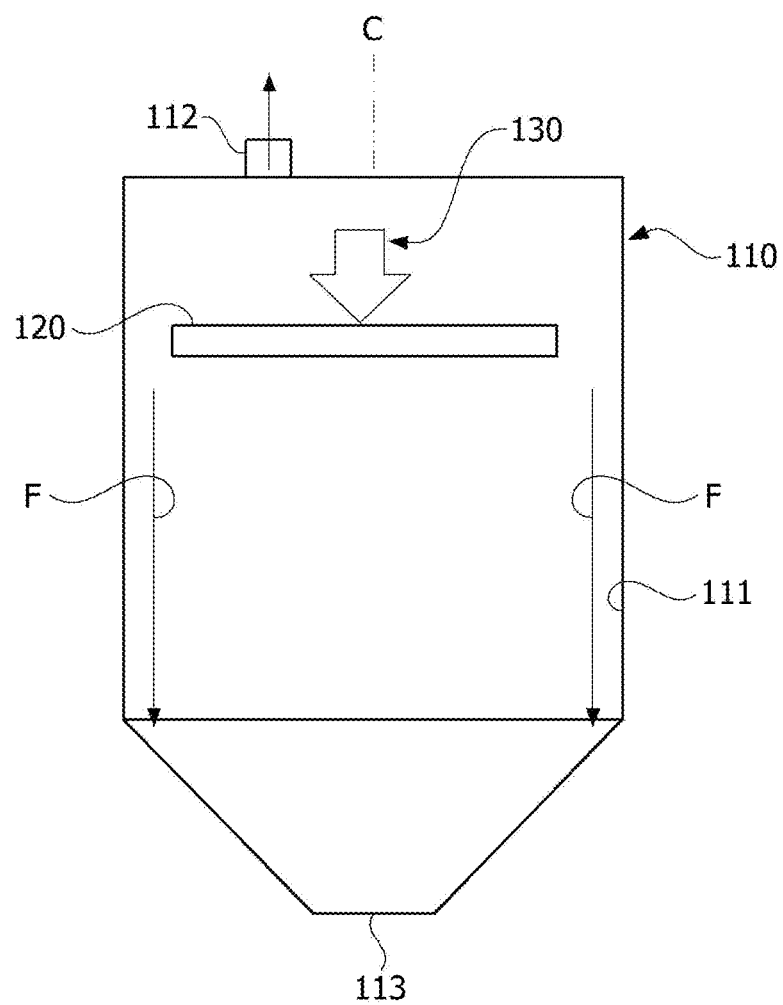

[Figure 3]
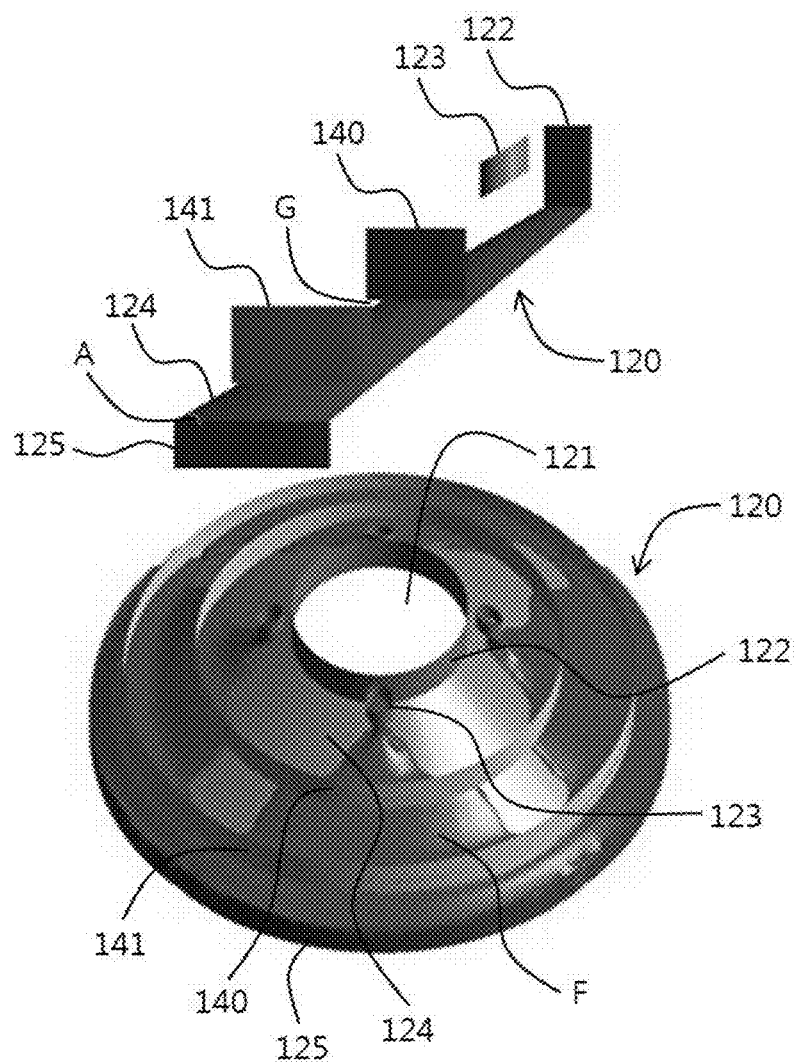

DISPERSING APPARATUS AND DEFOAMING APPARATUS COMPRISING SAME

CROSS-REFERENCE TO RELATED APPLICATIONS

The present invention is a national phase entry under 35 U.S.C. § 371 of International Application No. PCT/KR2019/010574, filed on Aug. 20, 2019, published in Korean, which claims priority to Korean Patent Application No. 10-2019-0076630, filed on Jun. 26, 2019, and Korean Patent Application No. 10-2018-0097495, filed on Aug. 21, 2018, the disclosures of which are hereby incorporated herein by reference.

TECHNICAL FIELD

The present invention relates to a dispersion device and a defoamation device comprising the same, and more particularly, relates to a dispersion device used in a falling film defoamation device and a falling film defoamation device comprising the same.

BACKGROUND ART

FIG. 1 is a schematic diagram showing a conventional defoamation device, wherein the conventional defoamation device (10) comprises a chamber (11), a dispersion member (12), a raw material supply part (20), and a vacuum hole (17). The vacuum hole (17) is connected with a vacuum pump.

The dispersion member (12) comprises a base part (13) having a ring shape, an inner wall (15) disposed on the inner diameter side of the base part (13), and an outer wall (14) disposed on the outer diameter side of the base part (13), where a raw material is stored in the dispersion member (12). At this time, a through hole (16) connected with the vacuum hole (17) is formed in the central region of the base part (13) in the dispersion member (12).

When the raw material is supplied from the raw material supply part (20) to the dispersion member (12), the raw material is accommodated in the base part (13), the raw material is retained in the dispersion member (12) until the level of the raw material reaches a predetermined height of the dispersion member (12), and the raw material is applied inside the chamber (11) by flooding the outer wall (14).

However, as the raw material stagnates in the dispersion member (12), there is a problem that fouling occurs.

In addition, as the prior art requires the installation of mechanical devices such as top distributors with complex designs for uniform wall application and wipers for uniform application to the film walls, there are disadvantages of increased installation costs and difficult operation and maintenance.

DISCLOSURE

Technical Problem

It is an object of the present invention to provide a dispersion device which is capable of preventing fouling and reducing installation costs, and that operation and maintenance are easy.

It is another object of the present invention to provide a defoamation device that can increase the defoamation efficiency and residual monomer removal rate.

Technical Solution

In order to achieve the above-described objects, the present invention provides a dispersion device, comprising: a dispersion plate having an inclined surface extending downwards obliquely from a center of the dispersion plate and having raw material inflow nozzles extending through the inclined surface, the raw material inflow nozzles being configured to introduce a raw material onto the inclined surface; and a band spaced apart from the inclined surface of the dispersion plate so as to form a gap between the band and the inclined surface, the band being configured so that the raw material flows through the gap when introduced onto the inclined surface.

In the present invention, the inclined surface may have a semi-conical shape, and the band may have a dam shape extending upwards relative to the inclined surface and extend in a ring shape in a circumferential direction of the inclined surface.

In the present invention, the dispersion plate may have a hole formed in the center and have an inner wall extending upwards and surrounding the hole, the dispersion plate also may have a side surface extending downwards from a lower end of the inclined surface, and the raw material inflow nozzles may be disposed adjacent to the inner wall.

In the present invention, the band may be one of 2 to 5 bands that are spaced apart from the inclined surface.

In the present invention, the gap between the inclined surface and the band may have a height of 1 to 5 mm.

In the present invention, the inclined surface may have an inclination angle of 20 to 40 degrees relative to a horizontal plane.

In the present invention, the raw material inflow nozzles may include 2 to 6 raw material inflow nozzles arranged at intervals of 60 to 180 degrees about a circumferential direction of the inclined surface.

In addition, the present invention provides a defoamation device comprising a chamber equipped with a vacuum hole connected to a vacuum pump and a discharge hole through which a defoamed raw material is discharged; and the above-described dispersion device disposed inside the chamber.

The defoamation device according to the present invention may be a falling film defoamation device, the defoamation device may be configured such that after the raw material is dispersed through the dispersion device, the raw material forms a falling film while falling down along an inner wall of the chamber.

In the present invention, the raw material may be a solution containing a polymer and residual monomers.

The defoamation device according to the present invention may be configured such that when the raw material flows through the defoamation device, bubbles and residual monomers contained in the raw material are simultaneously removed, and the defoamation device may be configured to achieve a residual monomer removal rate of 60% or more.

Advantageous Effects

According to the present invention, by installing a dam-type ring band on a dispersion plate, it is characterized in that a raw material solution is evenly distributed to increase the defoamation efficiency and residual monomer removal rate.

Also, the dispersion device according to the present invention has a relatively simple design consisting of a dispersion plate and a ring band, so that there are advantages that the installation cost is reduced and the operation and maintenance are easy compared to the prior art.

Furthermore, as a coating liquid becomes stagnant in a reservoir of the prior art, the fouling can occur, but the dispersion device of the present invention can prevent the fouling effectively without any stagnant region.

In addition, in the case of the prior art, many inflow nozzles must be installed to enable uniform application, but in the dispersion device of the present invention, the uniform application is possible even if a relatively small inflow nozzles are installed.

Moreover, in the case of using the defoamation device of this invention, the deforamation effect and residual monomer removal rate equivalent to or more than those of the prior art can be obtained and installation cost and operation cost can be reduced, whereby it has high business value.

In addition, in the case of using the defoamation device of the present invention, the defoamation and residual monomer removal can be performed with a simple structure without complicated mechanical devices, whereby it has high technical value.

BRIEF DESCRIPTION OF DRAWINGS

FIG. 1 is a schematic configuration diagram of a conventional defoamation device.

FIG. 2 is a schematic configuration diagram of the defoamation device according to the present invention.

FIG. 3 is a configuration diagram of a dispersion device equipped with the dispersion plate and the ring band according to the present invention.

MODE FOR INVENTION

Hereinafter, the present invention is described in detail.

FIG. 2 is a schematic configuration diagram of the defoamation device according to the present invention and FIG. 3 is a configuration diagram of a dispersion device equipped with the dispersion plate and the ring band according to the present invention, where the defoamation device according to the present invention may be consisted of a chamber (110), dispersion plate (120), a raw material supply part (130), ring bands (140, 141), and the like.

The defoamation device according to the present invention can be used in a defoamation process for removing bubbles and residual monomers from a raw material, for example, in a defoamation process in a spinning process for producing fibers from a polymerized solution. In the fiber production process, by removing bubbles and residual monomers from the solution, it is possible to eliminate process instability that the fibers are broken, or the like.

Referring to FIG. 2, the chamber (110) may be configured in a cylindrical shape, and the lower portion may have a tapered structure that its diameter decreases. A vacuum hole (112) connected to a vacuum pump may be formed in the upper portion of the chamber (110), and a discharge hole (113), through which the raw material with defoamed and removed residual monomers is discharged, may be formed in the lower portion of the chamber (110). As illustrated in the drawing, the vacuum hole (112) may be disposed toward the inner wall (111) of the chamber (110) and may also be disposed coaxially with the central axis (C) of the chamber (110). Similarly, the discharge hole (113) may also be disposed coaxially with the central axis (C) or toward the inner wall (111).

In FIG. 2, the dispersion plate (120) is illustrated as a quadrangle for simplification, but the specific structure of the dispersion plate (120) is the same as that of FIG. 3, and the dispersion plate (120) will be described in detail below.

The dispersion plate (120) may be disposed toward the upper portion of the chamber (110) and the raw material supply part (130) may be disposed toward the upper portion of the dispersion plate (120), but the positions of the dispersion plate (120) and the raw material supply part (130) are not limited thereto. The raw material supply part (130) may be configured in the form of a tube or a pipe, and the like, and may be connected to the raw material inflow nozzles of the dispersion plate (120).

When the raw material (F) in the form of a solution is supplied from the raw material supply part (130) to the dispersion plate (120) by a pump, gravity, or the like, the raw material (F) flows along the surface of the dispersion plate (120), and then flows while falling down along the inner wall (111) of the chamber (110) to form a uniform falling film with a predetermined thickness. At this time, a negative pressure is formed in the chamber (110) by a vacuum pump (not shown) connected to the vacuum hole (112), where bubbles may be removed from the falling film formed on the inner wall (111) of the chamber (110). That is, in order to form the raw material into a thin film, by applying the raw material (F) uniformly to the inner wall surface of the chamber (110) through the dispersion plate (120), without applying external force using separate equipment or the like, the film with a uniform thickness may be formed, as the raw material (F) flows along the inner surface of the chamber (110) in the direction of gravity. In FIG. 2, the inner wall (111) region indicated by the arrow can be seen as a defoamation region.

The upper view of FIG. 3 is a partial side view of the dispersion plate (120) and the ring bands (140, 141), and the lower view of FIG. 3 is a perspective view of the dispersion plate (120) and the ring bands (140, 141) viewed from above. Referring to FIG. 3, the dispersion plate (120) may be consisted of a passage hole (121), an inner wall (122), raw material inflow nozzles (123), an inclined surface (124), a side surface (125), and the like. The dispersion plate (120) may be configured in the form of a disk when viewed from above, and may be configured in the form of a semi-cone with the top cut off when viewed from the side. The dispersion plate (120) may be formed of a material having excellent wetting characteristics, for example, a metal material such as an SUS material, or a plastic material.

The dispersion plate (120) may preferably be configured in the form of a plate as a whole. That is, the lower portion of the semi-conical shaped dispersion plate (120) may be opened, and the inside may be empty. Alternatively, however, the lower portion may be sealed or the inside may also be filled. When the dispersion plate (120) is in the form of a plate, the inner wall (122), the inclined surface (124) and the side surface (125) may all be formed in a plate shape, except for the raw material inflow nozzles (123), where the inclined surface (124) may be configured as an inclined plate and the side surface (125) may be configured as a side plate. The raw material in the form of a solution flows along the inclined surface (124) and the side surface (125), which are outer surfaces of the dispersion plate (120).

The passage hole (121) serves to pass gas (air, bubbles, volatilized residual monomers, etc.) to the vacuum hole (112) side of the chamber (110). That is, the passage hole (121) is formed so as to penetrate the dispersion plate (120), so that the vacuum hole (112) and the lower region of the chamber (110) are connected to fluid movement. The passage hole (121) may be formed at the center of the dispersion plate (120), and may also be disposed coaxially with the central axis (C) of the chamber (110). The passage hole (121) may be configured in a circular shape, and the diameter may be, for example, 10 to 40% relative to the total diameter of the dispersion plate (120). If the diameter of the passage hole (121) is too small, a large pressure drop may occur, and the vacuum pressure may not be sufficiently transmitted.

The inner wall (122) may serve to prevent the raw material (F) from flowing toward the passage hole (121) and may also serve to guide the gas flow. The inner wall (122) may be extended in an upward vertical direction (on the basis of the virtual horizontal plane) so as to surround the passage hole (121) in the form of a ring and formed. The height of the inner wall (122) may be, for example, 10 to 40% relative to the total height of the dispersion plate (120).

The raw material inflow nozzle (123) serves to supply a raw material to the inclined surface (124), which is an upper surface (outer surface) of the dispersion plate (120). The raw material inflow nozzle (123) may be connected to the raw material supply part (130) by a tube or a pipe. The raw material inflow nozzle (123) may be formed adjacent to the inner wall (122) or in contact with the inner wall (122). The raw material inflow nozzle (123) may protrude from the inclined surface (124) in an upward vertical direction (on the basis of the virtual horizontal plane) and be formed, and the upper portion thereof may be opened. The raw material inflow nozzle (123) is placed on the inclined surface (124), and thus if the height thereof is constant, the raw material inflow nozzle (123) may be configured in a trapezoidal shape when viewed from the side as in FIG. 3, whereby the upper end of the raw material inflow nozzle (123) may also be inclined downward.

The raw material may be supplied from the lower portion of the raw material inflow nozzle (123) and filled up, and then overflow through the open upper portion of the raw material inflow nozzle (123) at the lower upper end in a lower position, thereby flowing into the inclined surface (124). However, alternatively, the raw material may also flow into the inclined surface (124) through a hole formed in the side surface of the raw material inflow nozzle (123) or a gap formed between the raw material inflow nozzle (123) and the inclined surface (124).

Two to six, preferably, 3 to 5 raw material inflow nozzles (123) may be installed at intervals of 60 to 180 degrees, preferably, 72 to 120 degrees along the circumferential direction of the dispersion plate (120) or the inner wall (122) in consideration of uniform application, cost, etc. In FIG. 3, 4 raw material inflow nozzles (123) are installed at intervals of 90 degrees. It is preferable that the intervals of the raw material inflow nozzles (123) are constant equal intervals. If the number of the raw material inflow nozzles (123) is too small, the uniform application may be difficult, whereas if it is too large, the structure may be complicated and the cost may be increased. The diameter of the raw material inflow nozzle (123) is not particularly limited, which may be, for example, 1 to 10% relative to the total diameter of the dispersion plate (120). In the prior art, the uniform application is possible only when a large number of raw material inflow nozzles must be installed, but in the present invention, even when the relatively small raw material inflow nozzles (123) are installed, the uniform application is possible by the inclined structure of the dispersion plate (120) and the dam-type ring bands (140, 141), and the like.

The inclined surface (124) serves to allow the raw material (F) to flow uniformly without stagnation. The inclined surface (124) may be extended downward from the inner wall (122) to the side surface (125), which is a portion adjacent to the chamber inner wall (111), obliquely and formed. The inclined surface (124) may occupy most of the area of the dispersion plate (120) and may, for example, occupy 65 to 95% of the total area of the dispersion plate (120) including the passage hole (121). Although the region where the raw material (F) is applied is covered by the raw material (F) indicated in red in FIG. 3, it is also the inclined surface (124) region. Since the inclined surface (124) occupies most of the dispersion plate (120), it may be configured in a semi-conical shape like the dispersion plate (120).

The inclination angle (A) of the inclined surface (124) may be appropriately set in consideration of the raw material solution viscosity, the number of the nozzles (123), and the like, which may be, for example, 20 to 40 degrees, preferably 25 to 35 degrees or 28 to 32 degrees based on the virtual horizontal plane. If the inclination angle (A) is too small, the raw material (F) may be stagnant or the flow rate may be slow, whereas if it is too large, the flow rate is fast, so that the uniform application may be difficult. In the prior art, as the coating liquid becomes stagnant in the reservoir, the fouling can occur, but the present invention can prevent the fouling effectively without any stagnation region by the inclined surface structure.

The side surface (125) serves to supply the raw material (F) toward the inner wall (111) of the chamber (110). The side surface (125) may be extended in the form of a ring in a downward vertical direction from the end of the chamber side of the inclined surface (124) and formed. The height of the side surface (125) may be, for example, 10 to 40% relative to the total height of the dispersion plate (120).

Referring to FIG. 3, the ring bands (140, 141) play a role in increasing deformation efficiency and thinning the raw material or film thickness by evenly distributing the raw material (F). The ring bands (140, 141) may act as a kind of barrier or diffusion action to spread the raw material (F) evenly. As can be confirmed in FIG. 3, the raw material (F) indicated in red flows radially along the inclined surface (124) after exiting the raw material inflow nozzle (123) and then spreads to a larger area while passing through the first ring band (140) and spreads to a far larger area while passing through the second ring band (141), whereby the uniform application is eventually possible with a thin thickness over the entire region of the distal end portion of the inclined surface (124).

The ring bands (140, 141) may be spaced apart from the inclined surface (124) of the dispersion plate (120) so that a gap (G) is formed from the inclined surface (124) of the dispersion plate (120) and the raw material (F) flows through the gap (G). For spacing apart the ring bands (140, 141) from the inclined surface (124), and supporting and fixing the spaced ring bands (140, 141), the ring bands (140, 141) may be fixed to the inclined surface (124) or others using a connecting member or a supporting member, and the like, while spacing apart them therefrom. The connecting member or the supporting member preferably directly connects the ring bands (140, 141) to the inclined surface (124), but it may also connect the ring bands (140, 141) to others other than the inclined surface (124) (for example, the inner wall (122), the chamber (110), and the like). The connecting member or the supporting member may be an independent member or may be integrated with the ring bands (140, 141) or the inclined surface (124). The fixing method may be appropriately set, which may be, for example, bonding, welding, screwing, fitting, or the like. The shape, number, size, spacing, etc. of the connecting member or the supporting member may be appropriately set in consideration of the flow of the raw material, and the like.

The ring bands (140, 141) may be configured in a ring shape while being extended in an upper vertical direction (on the basis of the virtual horizontal plane). Specifically, the ring bands (140, 141) may be configured in a dam shape extended upwards from the inclined surface (124) and a ring shape extended in the circumferential direction of the inclined surface (124). That is, when viewed from above, they may be circular, and when viewed from the side, they may be in the form of a plate. It is preferable that the ring bands (140, 141) are continuously connected in the circumferential direction in their entirety.

The number of ring bands (140, 141) may be appropriately set in consideration of the raw material solution viscosity, the number of nozzles (123), inclination angle (A) of the inclined surface (124), and the like, which may be arranged in, for example, 2 to 5, preferably 2 to 4, 2 to 3 or 3 to 4 on the inclined surface (124) of the dispersion plate (120). If the number of ring bands (140, 141) is too small, the uniform application effect may be insufficient, whereas if it is too many, the raw material flow may be lowered or the cost may be increased.

The thickness of the gap (G) formed between the inclined surface (124) of the dispersion plate (120) and the ring bands (140, 141) may be appropriately set in consideration of the raw material solution viscosity, the number of nozzles (123), the inclination angle (A) of the inclined surface (124), the number of bands (140, 141), and the like, which may be, for example, 0.1 to 10 mm, preferably, 0.3 to 9 mm, 0.5 to 8 mm, 0.7 to 7 mm, 0.9 to 6 mm, 1 to 5 mm, more preferably, 1 to 4 mm, 1 to 3 mm, 1 to 2 mm, 2 to 4 mm, 2 to 3 mm or 3 to 4 mm. If the thickness of the gap (G) is too small, the raw material flow may be reduced, whereas if it is too large, the uniform application effect may be insufficient.

The diameter of the first ring band (140) may be, for example, 40 to 80% relative to the total diameter of the dispersion plate (120). The diameter of the second ring band (141) may be, for example, 50 to 95% relative to the total diameter of the dispersion plate (120). The thickness of the ring bands (140, 141) may be, for example, 0.001 to 3% relative to the total diameter of the dispersion plate (120). The height of the ring bands (140, 141) may be, for example, 10 to 40% relative to the total height of the dispersion plate (120). The interval between the first ring band (140) and the inner wall (122) and the interval between the first ring band (140) and the second ring band (141) may be, for example, 10 to 40% relative to the total diameter of the dispersion plate (120).

The diameter of the dispersion plate (120) may be smaller than the inner diameter of the chamber (110), and the ratio of the maximum diameter of the dispersion plate (120) to the internal diameter of the chamber (110) may be 98% or more (less than 100%). Due to this diameter difference, a gap is formed between the chamber (110) and the dispersion plate (120). If the ratio is less than 98%, the raw material (F) does just fall down and does not flow along the inner wall (111) of the chamber (110), whereby the falling film may not be formed.

The thickness of the falling film may be determined according to the interval between the side surface (125) of the dispersion plate (120) and the inner wall (111) of the chamber (110). That is, according to the ratio of the maximum diameter of the dispersion plate (120) to the inner diameter of the chamber (110), the thickness of the falling film may be adjusted, and in the present invention, to form the falling film with a thin thickness, the interval between the side surface (125) of the dispersion plate (120) and the inner wall (111) of the chamber (110) may be adjusted to 5 mm to 10 mm or 7 mm to 8 mm. When the interval between the side surface (125) of the dispersion plate (120) and the inner wall (111) of the chamber (110) satisfies the above-mentioned range, the falling film with a thin thickness may be formed. When the interval between the side surface (125) of the dispersion plate (120) and the inner wall (111) of the chamber (110) exceeds the above-mentioned range, the defoamation efficiency and the removal efficiency of the residual monomers may be lowered. If the interval between the side surface (125) of the dispersion plate (120) and the inner wall (111) of the chamber (110) is less than the above-described range, the falling film flowing to the inner wall (111) may be cut off. The thickness of the falling film may be, for example, 3 to 10 mm.

The raw material may be a solution comprising a polymer and residual monomers. When the polymer is typically prepared, unreacted monomers inevitably remain in the final product, where these residual monomers must be removed. Since the monomers are usually volatile, they can be removed using the defoamation device according to the present invention. That is, in the present invention, the residual monomers as well as the bubbles contained in the raw material can be removed simultaneously. The type of the polymer is not particularly limited, which may be, for example, polyacrylonitrile (PAN) and butadiene rubber series polymers, and the like.

The falling film defoamation device of the present invention may have a residual monomer removal rate of 60% or more, preferably, 65% or more, 70% or more, 75% or more, or 80% or more. As the falling film defoamation device has a high residual monomer removal rate, it is advantageous in terms of the effects of the present invention, and thus the upper limit is not particularly limited, which may be, for example, 99% or less, 95% or less, or 90% or less. As the residual monomer removal rate satisfies the above-described range, the installation cost and operating cost of the falling film defoamation device can be reduced. At this time, the residual monomer may be measured using liquid chromatography (LC) or the like.

In addition, the present invention provides a method for defoaming a falling film using the above-described falling film defoamation device. The defoamation method according to the present invention may comprise steps of supplying a raw material to an inclined surface (124) through raw material inflow nozzles (123) of a dispersion plate (120); passing the supplied raw material through a gap (G) formed between the inclined surface (124) and the ring bands (140, 141) and simultaneously allowing it to be dispersed in a larger area than before passage; allowing the dispersed raw material to flow while falling down along the inner wall (111) of the chamber (110) to form a falling film; removing bubbles and residual monomers from the falling film by forming a negative pressure in the chamber (110).

The flow of the raw material in the dispersion plate (120) and the formation of the falling film in the chamber (110) are as described above. The negative pressure of the chamber (110) may be formed through a vacuum pump. The negative pressure may be, for example, 10 to 15 mbar, 12 to 15 mbar, 13 to 15 mbar or 14 to 15 mbar. Under the negative pressure in the above-described range, the bubble and residual monomer removal efficiency from the raw material may be excellent. The operating temperature of the chamber (110) may be, for example, 50 to 100° C., 54 to 94° C., 58 to 88° C., 62 to 82° C. or 66 to 76° C. The operating time of the chamber (110) may be, for example, 5 to 10 minutes, 5 to 9 minutes, 5 to 8 minutes or 5 to 7 minutes. Under the above-described conditions, the bubble and residual monomer removal efficiency may be excellent.

According to the falling film defoamation method of the present invention, defoamation efficiency and residual monomer removal efficiency can be increased, installation cost, operation and maintenance cost can be reduced, and fouling can be effectively prevented.

[Explanation of Reference Numerals and Symbols]

10: defoamation device, 11: chamber, 12: dispersion member, 13: base part, 14: outer wall, 15: inner wall, 16: through hole, 17, 112: vacuum hole, 20: raw material supply part, 110: chamber, 111: chamber inner wall, 112: vacuum hole, 113: discharge hole, 120: dispersion plate, 121: passage hole, 122: inner wall, 123: raw material inflow nozzle, 124: inclined surface, 125: side surface, 130: raw material supply part, 140, 141: ring band, A: inclination angle, C: central axis, F: raw material, G: gap

The invention claimed is:

1. A dispersion device, comprising:
a dispersion plate having an inclined surface extending downwards obliquely from a center of the dispersion plate and having raw material inflow nozzles extending through the inclined surface, the raw material inflow nozzles being configured to introduce a raw material onto the inclined surface; and
a band spaced apart from the inclined surface of the dispersion plate so as to form a gap between the band and the inclined surface, the band being configured so that the raw material flows through the gap when introduced onto the inclined surface,
wherein the gap extends between the inclined surface and a lower surface of the band, the dispersion device is configured such that all of the raw material flows on the inclined surface through the gap located below the band, and the band is fixed to the inclined surface and spaced apart from the inclined surface using a connecting member or a supporting member.

2. The dispersion device according to claim 1, wherein the inclined surface has a semi-conical shape, and the band has a dam shape extending upwards relative to the inclined surface and extends in a ring shape in a circumferential direction of the inclined surface.

3. The dispersion device according to claim 1, wherein the dispersion plate has a hole formed in the center and has an inner wall extending upwards and surrounding the hole, the dispersion plate also having a side surface extending downwards from a lower end of the inclined surface, and the raw material inflow nozzles are disposed adjacent to the inner wall.

4. The dispersion device according to claim 1, wherein the band is one of 2 to 5 bands that are spaced apart from the inclined surface.

5. The dispersion device according to claim 1, wherein the gap between the inclined surface and the band has a height of 1 to 5 mm.

6. The dispersion device according to claim 1, wherein the inclined surface has an inclination angle of 20 to 40 degrees relative to a horizontal plane.

7. The dispersion device according to claim 1, wherein the raw material inflow nozzles include 2 to 6 raw material inflow nozzles arranged at intervals of 60 to 180 degrees about a circumferential direction of the inclined surface.

8. A defoamation device comprising a chamber equipped with a vacuum hole connected to a vacuum pump and a discharge hole through which a defoamed raw material is discharged; and the dispersion device according to claim 1 disposed inside the chamber.

9. The defoamation device according to claim 8, wherein the defoamation device is a falling film defoamation device, the defoamation device being configured such that after the raw material is dispersed through the dispersion device, the raw material forms a falling film while falling down along an inner wall of the chamber.

10. The defoamation device according to claim 8, wherein the raw material is a solution containing a polymer and residual monomers.

11. The defoamation device according to claim 10, wherein the defoamation device is configured such that when the raw material flows through the defoamation device, bubbles and residual monomers contained in the raw material are simultaneously removed, and the defoamation device is configured to achieve a residual monomer removal rate of 60% or more.

* * * * *